(12) United States Patent
Kozloski et al.

(10) Patent No.: US 9,262,748 B2
(45) Date of Patent: Feb. 16, 2016

(54) IDENTIFYING LOCATIONS OF POTENTIAL USER ERRORS DURING MANIPULATION OF MULTIMEDIA CONTENT

(71) Applicant: International Business Machines Corporation, Armonk, NY (US)

(72) Inventors: James R. Kozloski, New Fairfield, CT (US); Peter K. Malkin, Ardsley, NY (US); Clifford A. Pickover, Yorktown Heights, NY (US); Justin D. Weisz, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 13/967,899

(22) Filed: Aug. 15, 2013

(65) Prior Publication Data
US 2015/0052089 A1  Feb. 19, 2015

(51) Int. Cl.
*G06N 99/00* (2010.01)
*G06Q 10/10* (2012.01)

(52) U.S. Cl.
CPC ............... *G06Q 10/10* (2013.01); *G06N 99/00* (2013.01)

(58) Field of Classification Search
CPC ...................................................... G06N 99/00
See application file for complete search history.

(56) References Cited

U.S. PATENT DOCUMENTS

| 4,853,878 | A | 8/1989 | Brown |
| 7,207,804 | B2 | 4/2007 | Hersh |
| 8,077,983 | B2 | 12/2011 | Qiu et al. |
| 8,266,051 | B2 | 9/2012 | Lawrence et al. |
| 2012/0249596 | A1 | 10/2012 | Colley |

OTHER PUBLICATIONS

W. Rouse and S. Rouse, "Analysis and Classification of Human Error", IEEE Trans. on Sys., Man, and Cybernetics, vol. SMC-13, No. 4, Jul./Aug. 1983, pp. 539-549.*
Burmistrov, I. et al., "Effects of Interruptions on the Computerised Clerical Task Performance," Published in: S. Overmyer and J. Gornostaev (Eds), Human-Computer Interaction: Human Aspects of Business Computing (Proceedings of East-West HCI '96), Moscow: ICSTI, 1996, 21-29.
Drake, T., "Measuring Software Quality: A Case Study," Computer 0018-9162/96, copyright 1996 IEEE, vol. 29, No. 11: Nov. 1996, pp. 78-87.

(Continued)

*Primary Examiner* — Wilbert L Starks
*Assistant Examiner* — Vincent Gonzales
(74) *Attorney, Agent, or Firm* — Fleit Gibbons Gutman Bongini & Bianco PL; Jon A. Gibbons

(57) ABSTRACT

Disclosed is a novel system and method for indicating a probability of errors in multimedia content. The system determines a user state or possible user distraction level. The user distraction level is indicated in the multimedia content. In one example, work is monitored being performed on the multimedia content. Distractions are identified while the work is being monitored. A probability of errors is calculated in at least one location of the multimedia content by on the distractions that have been identified. Annotations are used to indicate of the probability of errors. In another example, the calculating of probability includes using a function F(U,S,P) based on a combination of: i) a determination of user state (U), ii) a determination of sensitivity (S) of user input, and iii) a determination of user characteristics stored in a profile (P).

20 Claims, 7 Drawing Sheets

(56) References Cited

OTHER PUBLICATIONS

Durrani, S.K., "Data Entry Error in Mobile Keyboard Device Usage Subject to Cognitive, Environmental, and Communication Workload Stressors Present in Fully Activated Emergency Operations Centers," PhD Thesis, University of Central Florida, Orlando, FL, 2009, 155 pgs.

Khoshgoftaar, T.M., et al., "Predicting Software Development Errors Using Software Complexity Metrics," IEEE Journal on Selected Areas in Communications, vol. 8, No. 2, Feb. 1990, 0733-8716/90/0200-0253 copyright 1990 IEEE.

Soukoreff, R.W., et al., "Metrics for Text Entry Research: An Evaluation of MSD and KSPC, and a New Unified Error Metric," CHI 2003, Apr. 5-10, 2003, Ft. Lauderdale, FL, copyright 2003 ACM 1-58113-630-7/03/0004.

\* cited by examiner

| USER | USER STATE (U) | SENSITIVITY (S) | PROFILE (P) |
|---|---|---|---|
| USER 1 | • 100 LINES OF CODE<br>• MONDAY<br>• 11:15AM<br>• HOME | • ENCRYPTION MODULE<br>• HIGHLY SENSITIVE<br>• COMPLEX<br>• HIPPA<br>• 128 BIT ENCRYPTION | • LOW SENSITIVITY<br>• MODERATE HISTORY OF ERRORS<br>• NOT CROWD SOURCED<br>• INFANT DETECTED<br>• PROGRAMMER |
| USER 2 | • 30 LINES OF EMAIL TEXT<br>• SUNDAY<br>• 7:02PM<br>• HOME | • SALES FOLLOW-UP<br>• SENSITIVE<br>• MODERATE<br>• N/A<br>• N/A | • MODERATE SENSITIVITY<br>• LOW HISTORY OF ERRORS<br>• NOT CROWD SOURCE<br>• N/A<br>• SALES |
| ... | ... | ... | ... |
| USER N | • 600 LINES OF TEXT<br>• THURSDAY<br>• 3:51PM<br>• OFFICE | • PRODUCT DESCRIPTION FOR WEBSITE<br>• SENSITIVE<br>• SIMPLE<br>• FDA<br>• N/A | • HIGH SENSITIVITY<br>• MODERATE HISTORY OF ERRORS<br>• CROWD SOURCED<br>• N/A<br>• WRITER |

IDENTIFYING LOCATIONS OF POTENTIAL USER ERRORS DURING MANIPULATION OF MULTIMEDIA CONTENT

BACKGROUND

The present invention generally relates to the manipulation of multimedia content, and more specifically to identifying locations of potential user errors while working on multimedia content.

Office workers are often engaged in content creation activities, such as when they write documents or computer code, or create multimedia content, such as presentations, spreadsheets, reports, designs, mathematical models, artwork, and more. Often, mistakes or errors are introduced in these artifacts, such as typos, misspellings, or compilation or logic errors.

Distraction can play a large role in errors. In office environment today, workers are constantly exposed to numerous distractions. Distractions come from a variety of sources. For example, distractions include exotic ring tones from a co-worker's cell phone. People asking question or speaking with others near the desk or cubicle of a worker. Distractions also include pop-ups and other alerts for emails, text messaging and calendar events. These distractions many times slow worker productivity and accuracy.

While some distractions are manageable, like turning off instant messaging or placing telephone systems on "do not disturb" status. Certain situations types of distractions are not as manageable. For example, some businesses make it mandatory for employees to keep email or company internal instant messaging active at all times.

BRIEF SUMMARY

Disclosed is a system and method that automatically determines for indicating a probability of errors in multimedia content based on a user state. The user state is related to a possible user distraction level. This user detraction level is annotated in multimedia content being manipulated by the user. The distraction level may be indicated through a combination of annotations, sound, or haptic feedback. For example, colors may be used to annotate locations in text documents, such as computer code, during times in which the programmer was heavily distracted as determined by the user distraction level. Various considerations affect the nature of the indication of distraction level. A user profile and the "sensitivity" of a particular section of the multimedia content, such as, a field of text, or area of a drawing.

In one example, work is monitored being performed by a user on the multimedia content. Distractions are identified while the work is being monitored. A probability of errors is calculated in at least one location of the multimedia content by on the distractions that have been identified. Annotations are used to indicate of the probability of errors. Multimedia content is broadly used to include text, sound, a 2-D picture, a 3-D picture, a 2-D video, a 3-D video, or a combination thereof. In another example, the calculating of probability includes using a function $F(U,S,P)$ based on a combination of: i) a determination of user state (U), ii) a determination of sensitivity (S) of user input, and iii) a determination of user characteristics stored in a profile (P).

Monitoring can include contemporaneous monitoring of pop-ups on a graphical user interface, instant messaging, e-mail, operation of telephone, detection of other people within an area, switching of windows on a graphical user interface, amount of elapsed time on a given task, ambient noise. Biometric contemporaneous monitoring can also include user eye-tracking, user typing speed, user heart rate, user breathing rate, user blink frequency, user skin conductance, or a combination thereof.

In one example, the user state (U) can include an output of the work being performed on the multimedia content, day of week, time of day, location, or a combination thereof. In another example, sensitivity (S) can include a location in the multimedia content, a category of the multimedia content, a complexity of the multimedia content, regulatory requirements, legal requirements, or a combination thereof. In yet another example, the profile (P) can include sensitivity according to times of day, history of creating errors, crowdsourcing of a team, presence of specific individuals within a given area, vocational profile of user, or a combination thereof. Moreover, the function $F(U,S,P)$ may use machine learning.

Annotating the location with an indication of the probability of errors is broadly defined to include annotating with color of text, color of background area, blinking font, font size, textures, insertion of tracking bubbles, audio, graphics, or a combination thereof. In one example, distractions are displayed that have been identified in conjunction with the annotating. In another example, the multimedia content is a video game or virtual universe and the annotating indicates areas of user game play with probabilities of distractions.

BRIEF DESCRIPTION OF THE SEVERAL VIEWS OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2 is a table illustrating one example of a user state, sensitivity, and profile;

FIG. 5 illustrates annotating locations within source code with an indication of probability of errors;

DETAILED DESCRIPTION

Figure 1:
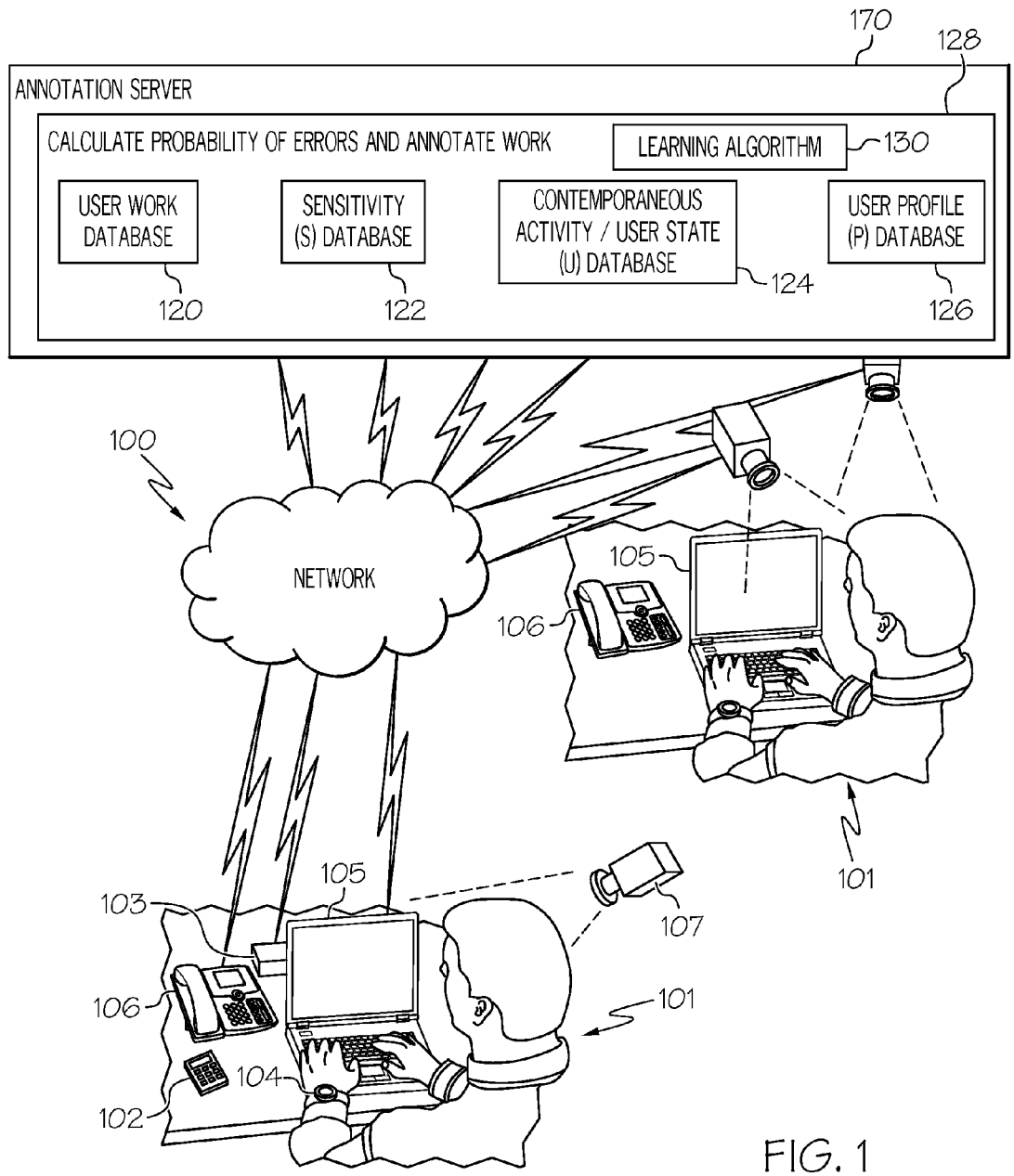
FIG. 1 is a functional diagram illustrating one example of an operating environment.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Non-Limiting Definitions

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "annotating" is used to indicate a location in a multimedia content. The annotating can be color of text, color of background area, blinking font, font size, textures, insertion of tracking bubbles, or a combination thereof. In the case of where the multimedia content is audio or video, the annotating can be a graphical representation graphical markers in a graphic representation of the audio signal, additional audio, or a combination thereof. The annotating can include the type of a description of the distraction itself The term "contemporaneous monitoring" is recording activities that occur during the period time when the user is working with multimedia content. These activities may be monitored by the computer itself, a camera with a microphone, or a combination of both. The activities include pop-ups on a graphical user interface, instant messaging, e-mail, operation of telephone, detection of other people within an area, switching of windows on a graphical user interface, an amount of elapsed time on a given task, ambient noise, user eye-tracking, user typing speed, user heart rate, user breathing rate, user blink frequency, user skin conductance, or a combination thereof.

The term "distractions" is any interruption, diversion, which may inhibit a user from giving full attention to working with multimedia content.

The term "function f(U,S,P)" is a relationship between user state (U), sensitivity (S) and user profile (P) to calculate the likelihood or probability of errors. The function f(U,S,P) may include using history and machine learning algorithms, such as Bayesian algorithms and neural networks. The machine learning algorithms can include both supervised and unsupervised algorithms.

The term "monitoring work" is recording user interactions while working with a multimedia content.

The term "multimedia content" is any text, sound, 2-D picture, 3-D picture, drawing, video, or combination thereof. Examples of multimedia content are documents, e-mail, books, web pages, programming code, music, 2D and 3D video, a virtual world, and games.

The term "profile (P)" is information about when a user is working on multimedia content. This information may include an sensitivity according to times of day, history of creating errors, crowd-sourcing of a team, presence of specific individuals within a given area, vocational profile of user, or a combination thereof.

The term "sensitivity (S)" is information about the work itself being performed. This information may include a location in the multimedia content, a category of the multimedia content, a complexity of the multimedia content, regulatory requirements such as FDA, HIPPA, SEC, legal requirements, such as state bar rules, or a combination thereof.

The term "user state (U)" is information about when a user is working on multimedia content. This information includes an output of the work being performed on the multimedia content, a day of week, a time of day, a location, or a combination thereof.

The term "user work" or simply "work" is multimedia content creation activities performed by a person. Work can be the writing, editing of documents or computer code, or other multimedia content, such as presentations, spreadsheets, reports, designs, mathematical models, artwork, movies, and more.

Operating Environment

FIG. 1 is a functional diagram illustrating one example of an operating environment in which a user_101 using a computer 105 is performing work on multimedia content rendered on display 112. An annotation server 170 is communicatively couple over a network 100 to the user computers 101. The annotation server 170 includes a software module 128 to calculate the probability of errors and annotate work as will describe further below. The annotation server 170 may include one or storage areas or databases for recording information. Although for clarity these databases are shown as separate storage areas or databases it is important to note that only a single storage area or database may be used. The databases shown are user work database 120, a sensitivity (S) database 122, contemporaneous activity/user state (U) database 124, user profile (P) database 126. The user profile (P) database 126 contains information about a specific user that will be discussed further below. The sensitivity (S) database 122 is information related to the multimedia content being manipulated by the user. For example, a sensitivity level may be assigned to different work tasks the user is performing on the multimedia content. A company may assign a high sensitivity to an encryption module because of the mathematical complexity being realized by the computer code and to meet government regulations. In another case, a user filing out a form in a call center may have their work rated as highly sensitive for specifically designated fields. For example the company may designate fields such credit card numbers and social security numbers as sensitive. The history of the user work is stored in user work database 120. The user_101 is using many devices such as a telephone 106, a computer 105, a watch 104, a recorder 103, and a calculator 102. User_101 performs various actions on the devices around him. These actions are recorded by a video camera 107, and by a processor 110 that is running in the computer 105. Other embedded devices may also contain this processor 110 that records a user's actions. Some items are connected to the network, such as the computer 105, or the telephone 106. Other devices, such as the watch, 104, or calculator 102, may be indirectly connected to the network through a near field wireless connection such as BlueTooth® wireless link to the computer 105 or are monitored by the cameras 107.

A similar description can be seen for another user_101 at a different location. This user also has several video cameras 107, and a computer 105. The video cameras can have more than one use. They can be used as to monitor other activities while the work is being performed by a user. For example the cameras can help with monitoring contemporaneous activities such as operation of telephone, detection of other people within an area, user eye-tracking, user breathing rate, user blink frequency, or a combination thereof. The contemporaneous activities for each user that are being monitored may be stored in a contemporaneous activities/user (U) state database 124.

Turning now to FIG. 2, shown is a table 200 illustrating one example of a user state, sensitivity, and profile. Information for three users, user_1 210, user_N 220, and user_1 230 are shown. In the column for user state (U) 260 information about what user_1 is working on (e.g. 100 lines of code). The day of the week (Monday) and time of day (11:15AM) and work location (home). The sensitivity associated with the work being performed by user_1 210 is shown in column 270. This code is an encryption module. It is highly complex. It must meet Federal HIPPA requirements with 128 bit encryption. Given this high sensitivity, the work user_1 210 is performing would be deemed highly sensitive. User_1 210 has a profile in column 280 show a history of low sensitivity to distractions with moderate history of errors. In this example user_1 210 is a programmer working from home a sleeping infant is detected in the room. This code is not being crowd sourced. So typical crowd source error checking is not possible. That is, assigning the same work to multiple people. Where the work is only accepted when a given percentage of people provide a highly similar work products or solutions.

User_2 220 has a user state 260 identified as working on an email Sunday night at 7:02PM from home. The sensitivity (S) 270 is a sales follow-up which is sensitive and moderate complexity. The profile (P) 280 indicates a moderate sensitivity with a low history of errors and this is not crowd source. None has been detected in the room and this is a sales/marketing representative.

User_N 230 is working late afternoon (3:51PM Thursday) in an office on text for product description. The work is a product description for a website. The work is categorized as sensitive (sensitivity (S) 270) but relatively simple and must follow FDA advertising rules. For user_N 230 the profile (P) 280 shows high sensitivity, with a moderate history of errors. This work is crowd sourced and this person is a copywriter.

Calculating Probability of Errors

Figure 3:
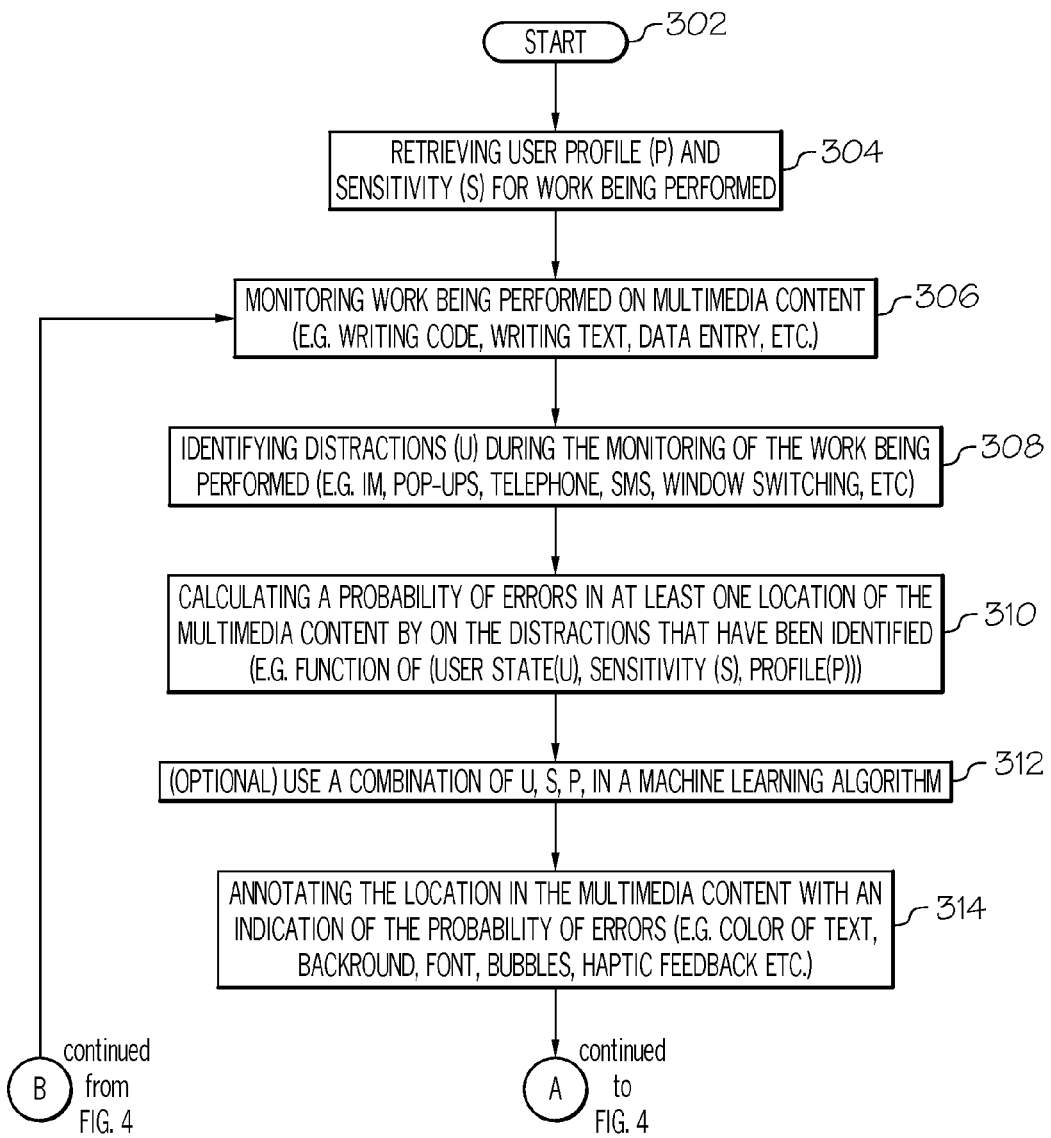
FIG. 3 and FIG. 4 is a flow chart of a indicating probability of errors within multimedia content.
Figure 4:
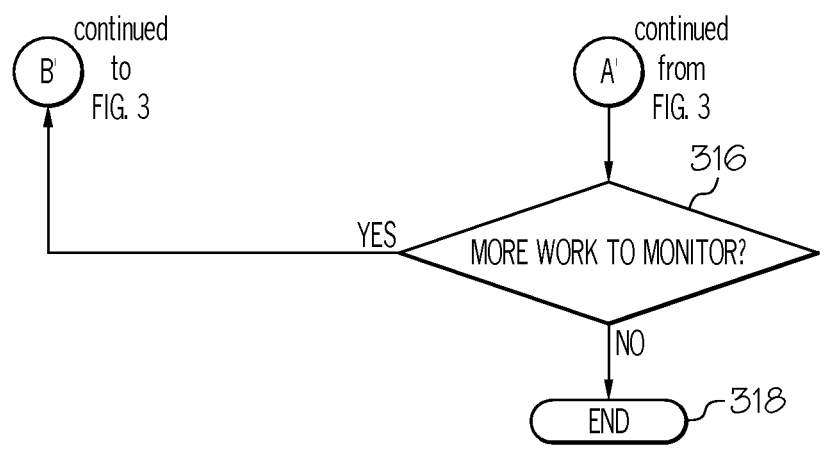

FIG. 3 and FIG. 4 is a flow chart of a indicating probability of errors within multimedia content. The process begins in step 302 and immediately proceeds to step 304 to retrieve a user profile (P) and sensitivity (S) for work being performed. A user profile (P) may be used to store certain useful characteristics of a user. For example, certain individuals may be more or less prone to distractions, or making errors, in some settings than other people. Other relevant information may be have an estimated effect on user state (U) during certain times of day, timezones/jetlag, a past history of creating errors, crowd-sourcing of a team, the presence of certain individuals within threshold radius R, but perhaps not other individuals within the radius R, etc. Other considerations may include: the day of week, holidays, location, amount of time on task, distraction level as measured by task switching, ambient noise, asking the user, typing speed, biometrics (heart rate, GSR, blink speed, etc.). The profile (P) may also contain the user's vocational field.

Examples of sensitivity (S) includes is this line of text likely to be highly important relative to another line of text. The "sensitivity" of a particular input (e.g. text input) is estimated. As an example, perhaps the entry of text in a particular region of functioning program code is more sensitive (S) to distractions and user states (U) than the entry of text into regions of a code that are commented out.

In one example, the sensitivity is higher in regions of a code that are functionally relative to regions of a code that are commented out. Sensitivity may also be quantified by the number and nature of relationships of the code to particular object interfaces and the overall software architecture.

Next, work being performed is monitored on multimedia content in step 306. Examples of the work being monitored include writing code, writing text, data entry and more. A user may be typing program code in a code editor, writing a technical paper, composing an email, writing a book, etc. During the creation of such kinds of text, a user may be in various states such as a distraction state. For example, a user may be coding while on the phone, while multitasking, while being engaged with several windows on a computer GUI (graphical user interface), while operating a vehicle, while having audio distractions, while talking with others, while exhibiting various biometric indicators of states, e.g. sleepiness, arousal, anger, etc. Some of these states may be associated with an increased or decreased likelihood of the input text containing errors. For example, perhaps if a user is on the phone and entering code into a program code editor, the chances of introducing errors will be higher than if the user is entering code without distraction. It is possible to determine the user state (U) by many means, including an assessment of his/her engagement with various GUI windows during a period of time, a determination of number of pop-up windows, e.g. instant message windows or incoming email notification windows, within a period of time, a phone call, etc.

Certain biometric measurements may be performed using methodology such an eye-tracking and other known methods. The user's office may be monitored in a non-intrusive way to determine if many people are within a radius R of the person, thus increasing the odds of certain classes of users being distracted.

In step 308, distractions are identified based on the user state (U) during the monitoring of the work being performed. Examples of distractions are IM, pop-ups, telephone calls, window switching and more. In step, 310, a probability of errors is calculating a probability of errors in at least one location of the multimedia content by on the distractions that have been identified. An example of calculating is a function of Function (User State(U), Sensitivity (S), Profile(P)).

Next, an optional step 312, uses a machine learning algorithm as part of the function above. Stated differently, the machine learning algorithm may "learn" that a user is more distractible in certain situations than others and rely on such factors as: the time of day, a past history of creating errors, crowd-sourcing of a team, the presence of certain individuals within threshold radius R (but not other individuals), and more.

The location of the multimedia content is annotated based on function F(U,S,P), with an indication of the probability errors in step 314. Examples of annotations include color of text, background, font, bubble, haptic feedback, and more. These regions may be important, and risk of errors is more important to consider. Certain fields in a document may be more sensitive than others. For example, perhaps the entry of a social-security number is sensitive because correctness is crucial, but other areas are less sensitive. Based on a function F(U,S,P), the system automatically provides an indication (e.g. visual indication) in a document (e.g. color a line of text red). Indications include: color of text, color of background area, blinking, font size, textures, the insertion of tracking bubbles, etc. The nature of this indication may also be specified in a user profile.

Figure 6:
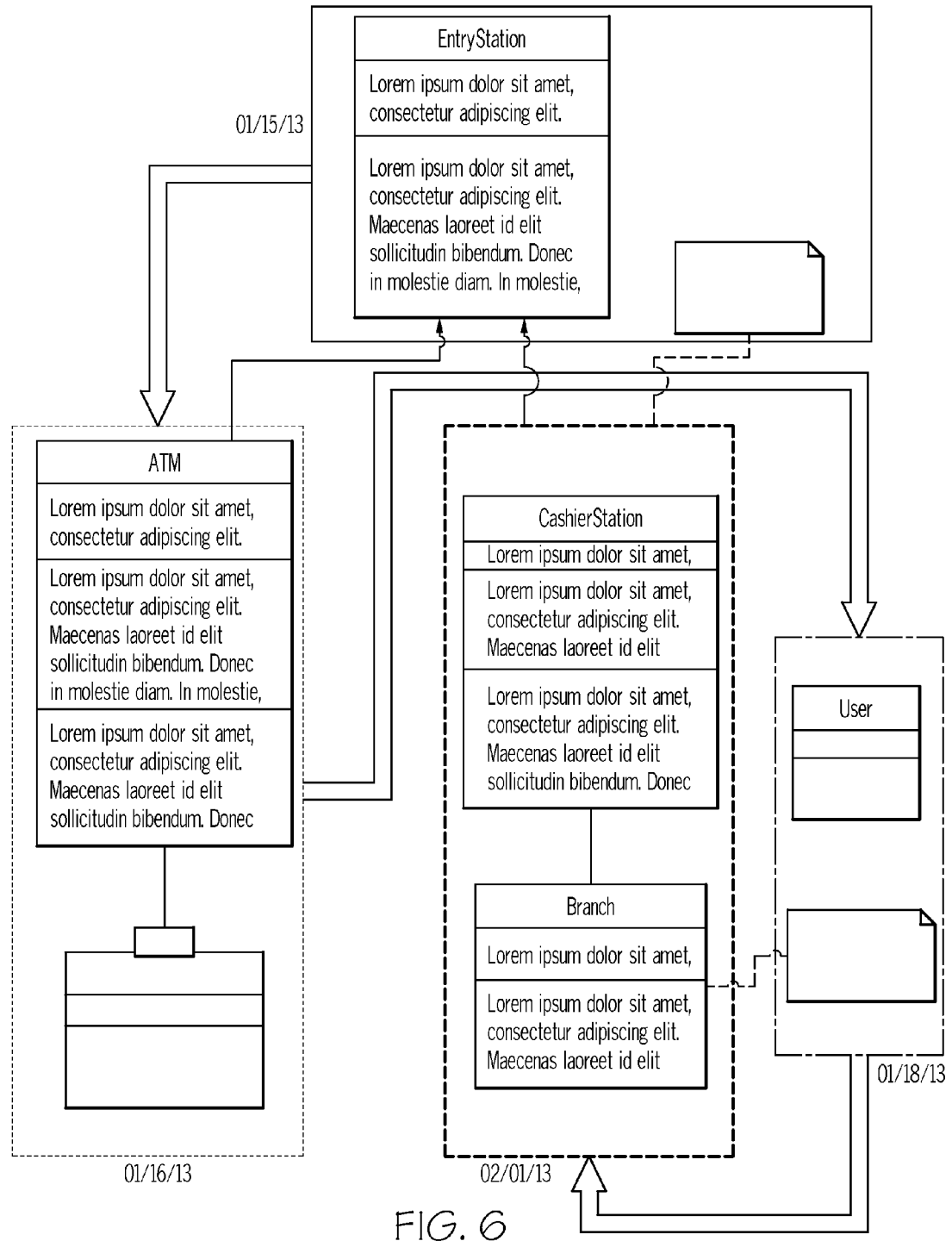
FIG. 6 illustrates annotating locations within modeling diagram an indication of probability of errors.

In one embodiment, the user may conveniently search a document for areas associated with certain user states. For example, a user may wish to search for regions of code created during a high level of distraction. To facilitate this, in step 314, the display may include timeline information. Because it is often the case that the user-state (U) changes more slowly than text entry proceeds, large sections of text may be clustered or color-coded according to: 1) their generation during a similar user state (U), and 2) their generation during a particular time. This clustering optimally may then be used to display a dual timeline of: 1) the user's state (U), and 2) the sections of text generated. This timeline may provide additional value to the user in the preferred embodiment of coding, since the debugging of code may examine relationships between sections of code. The sections themselves, for example, C++ objects, methods, etc., may be further identified by the time(s) they were composed and the composite user state (U) score during their composition. The user state (U) and code section, may then be intuitively displayed as a timeline embedded within a UML diagram. See FIG. 5 for an example of annotating locations within source code with an indication of probability of errors. Likewise, FIG. 6 is an example annotating locations within modeling diagram an indication of probability of errors.

Figure 5:
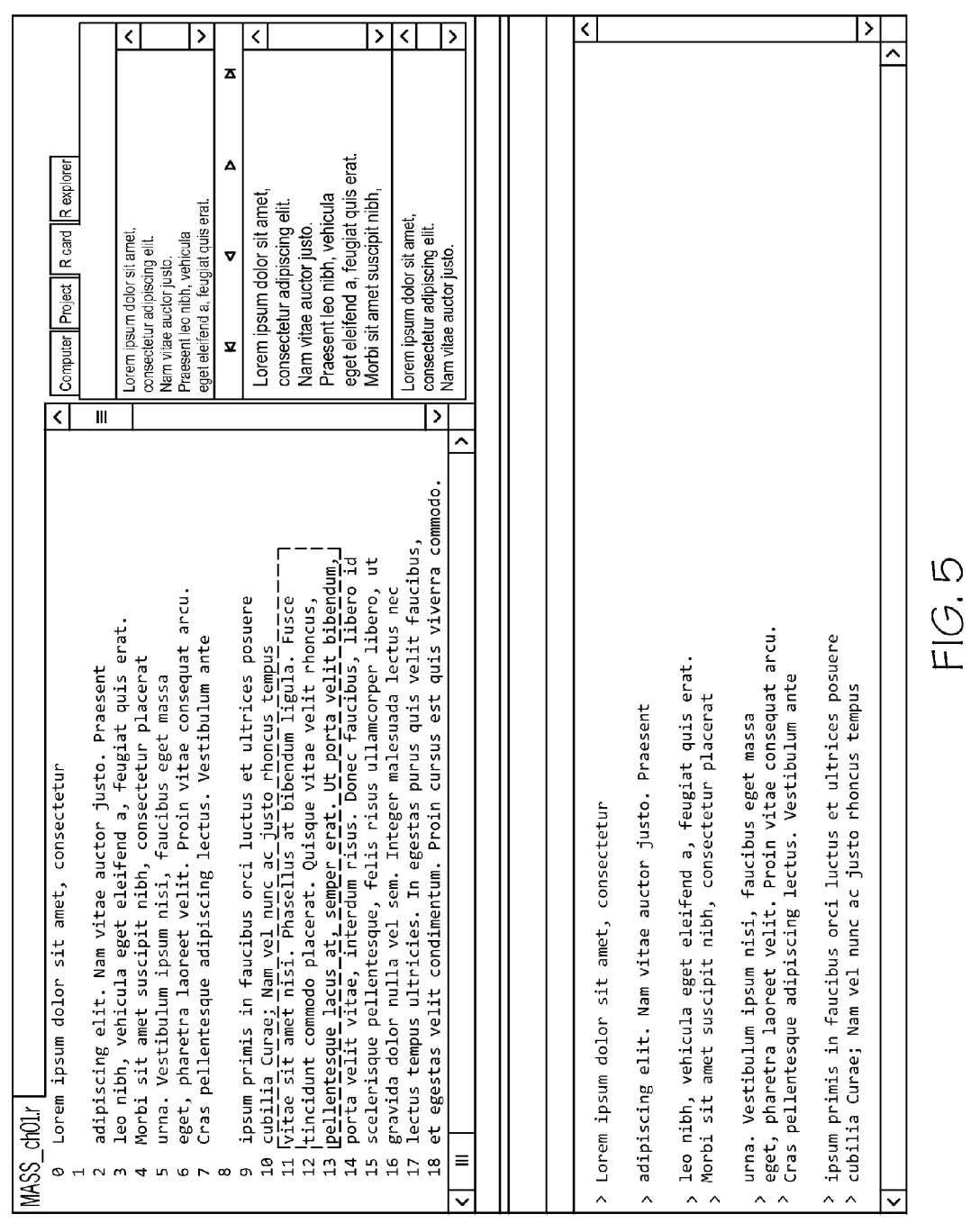

In FIG. 5 illustrates a colored hue is applied to code in code editor, based on distraction level when the code was created. Also, this particular area of the code may automatically be deemed more crucial or prone to errors than another area, and this may alter the shade of color used. The claimed invention may be applicable to video, audio, games, and virtual worlds.

Note that the marking of the multimedia content may extend from text to other modalities including video, audio, games, and virtual worlds. For example, the multimedia content may be the result of the traversal of a virtual world or 3D game, and the indications, e.g., red and green highlighting, indicate those traversals that were made during certain user states U. As virtual worlds become more important in the future for conducting business, and indication of user state (U) becomes increasingly useful. Similarly, users may create various objects for use in a game or virtual world, e.g. clothing, pets with various functions, vehicles, rooms in a home, etc. Such objects may provide an indication of user state (U), so as to possibly indicate where erroneous behavior might occur due to distraction levels during a the creation period of the object.

The multimedia content may be an audio signal, e.g., dictation or music performance, and the indication, e.g., red-highlighting or sound-effect, is applied to a graphic representation of the audio signal, e.g., a volume-level timeline, or to the audio signal itself, e.g. via sounds. The multimedia content may be a video signal, e.g., video from a closed circuit camera, and the indication, e.g., red-highlighting is applied to the identified sections or sub-clips of the view signal.

In another examples, the knowledge workers are often engaged in content creation activities, such as when they write documents or computer code, or create multimedia contents such as presentations, spreadsheets, reports, designs, mathematical models, artwork, etc. Often, mistakes or errors are introduced in these multimedia contents, such as typos, misspellings, or compilation or logic errors. Here, we propose a system that learns models of the circumstances in which a user typically introduces errors or mistakes into their work, and uses these models to annotate content as it is being created with a probabilistic assessment of its likelihood for containing mistakes or errors.

In this related embodiment, a system may automatically collect data for the user model by monitoring a user while they are engaged in a content creation activity. The model tracks information including time of day, day of week, location, and amount of time spent on the task, distraction level, e.g. how often the user switches tasks or how much ambient noise there is in the environment, typing speed, and errors/mistakes made. Errors can be determined by the system, e.g. a spell-checker or compiler, they can be inferred, e.g. the user re-edits a sentence or deletes a line of code, or they can be specified manually, e.g. the user highlights a section of an image they messed up or a section of text they wish to re-write.

Additional, the system may train the user model using conventional machine learning techniques to determine which features correlate with the user making mistakes. For example, the model may determine that the user makes more mistakes in the morning vs. the evening, or when there is a large amount of ambient noise, or when they are typing rapidly.

Finally, during subsequent content creation activities, the system may score the likelihood of the user making a mistake using the user model. This score can be used to annotate the content as well, such as color-coding code based on the likelihood that it contains a bug.

Note that in step 314, indications may include other facts of feedback. For example, the system may map of different activities and the kinds of errors/mistakes that can be track. For example, in the domain of writing, consider: spelling, grammar, places where the writing is rough or confusing. During document creation, consider formatting/layout. In coding, consider: compilation errors, bugs/logic problems. In spreadsheets, consider formulas. In presentations, consider layout, order, spelling/grammar of text content. For artwork, consider regions that need to be fixed or improved in some way. For musical compositions, consider wrong notes. For legal documents, consider legal concerns.

Note that "errors" or "mistakes" are not the only consideration of this method and system, because iteration is a part of the creative process, and one typically returns to a piece of content and changes aspects of a creation to make it better. So, for example, it may not be that a user simply makes the fewest errors in the morning; it may be that the user tends to produce the most "final" work in the morning.

In one example, the probability of errors increases linearly with the number of potential distractions, which may include very easy-to-monitor OS-related features such as window-switching on a GUI, pop-up windows per unit time, and engagement with other applications such as Web browsers, instant-message windows, and the like. Thus, in this simple embodiment, probability of errors P=function (N), where N is the number of potential distractions during which a region of text is written. Thus, to answer your question, as an example, we simply compute P and map this to a coloration applied to a region of the document.

In another example, a dependent feature is added in which a sensitively (S) of the text input is estimated and used for determining the nature of the said annotation, e.g. color of markings. As an example, perhaps the entry of text in a particular region of functioning program code is more sensitive to distractions and user states than the entry of text into regions of a code that are commented out. More sensitive regions may be important, and risk of errors is more important to consider. Certain fields in a document may be more sensitive than others. For example, perhaps the entry of a social-security number is sensitive because correctness is crucial, but other areas are less sensitive.

In step 316, a test is made if more work is left to be monitored. In the case more work is left to be monitored, the process returns to step 306, in which work is monitored. Otherwise, the flow chart ends in step 318.

It should be appreciated that the flow diagrams hereof are illustrative. One or more of the operative steps illustrated in any of the flow diagrams may be performed in a differing order. Other operations, for example, may be added, modified, enhanced, condensed, integrated, or consolidated with the steps thereof. Such variations are intended to fall within the scope of the appended claims. All or portions of the flow diagrams may be implemented partially or fully in hardware in conjunction with machine executable instructions to possibly indicate where erroneous behavior might occur due to distraction levels during a creation period of the object.

Information Processing System

Figure 7:
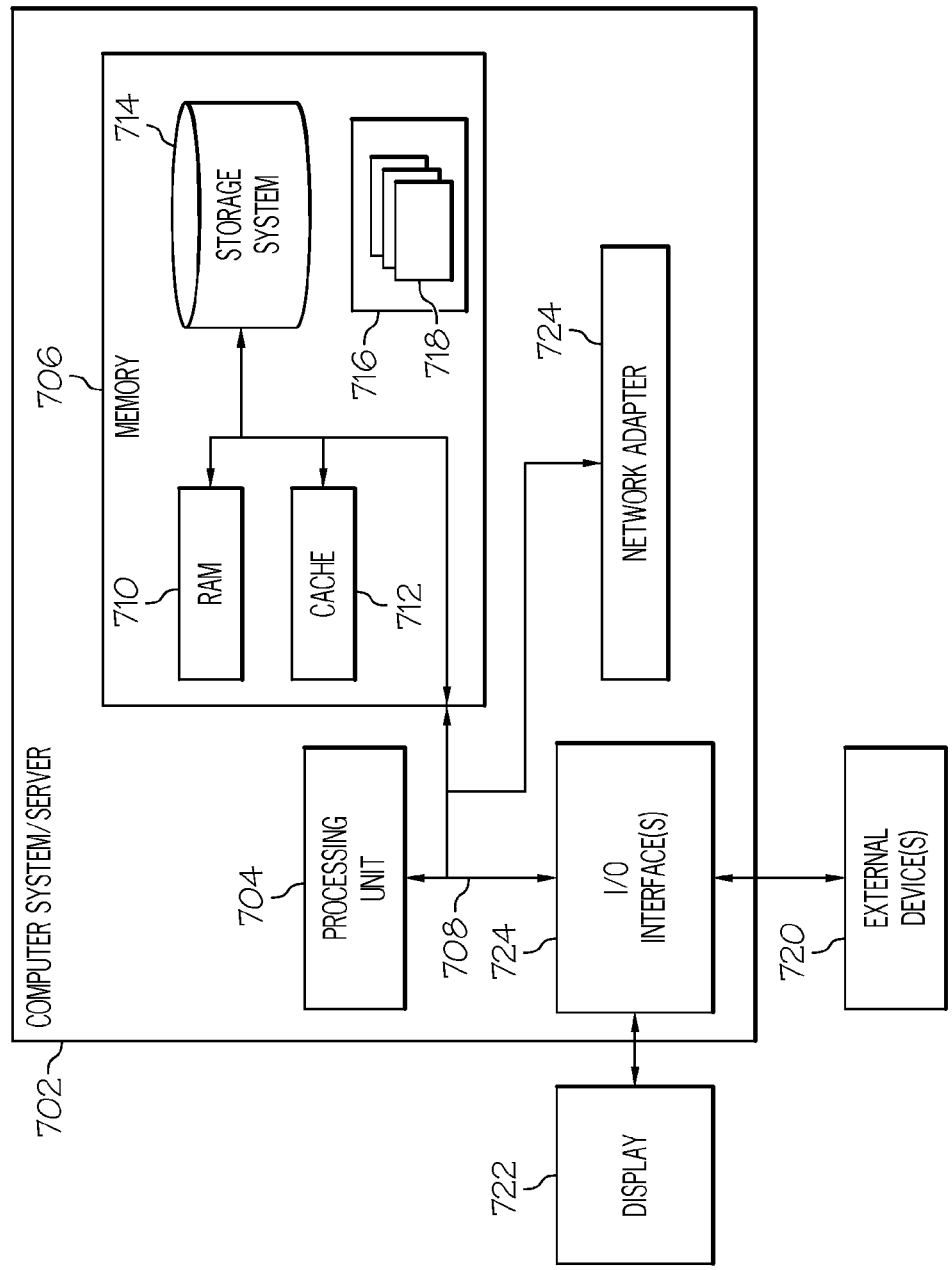
FIG. 7 is a block diagram illustrating one example of an information processing system.

Referring now to FIG. 7, this figure is a block diagram illustrating an information processing system that can be utilized in embodiments of the present invention. The information processing system 702 is based upon a suitably configured processing system configured to implement one or more embodiments of the present invention (e.g., the Calculate Probability of Errors and Annotate Work Module 128 of FIG. 1). Any suitably configured processing system can be used as the information processing system 702 in embodiments of the present invention. The components of the information processing system 702 can include, but are not limited to, one or more processors or processing units 704, a system memory 706, and a bus 708 that couples various system components including the system memory 706 to the processor 704.

The bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 7, the main memory 706 includes the Calculate Probability of Errors and Annotate Work Module 128. The system memory 706 can also include computer system readable media in the form of volatile memory, such as random access memory (RAM) 710 and/or cache memory 712. The information processing system 702 can further include other removable/non-removable, volatile/non-volatile computer system storage media. By way of example only, a storage system 714 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 708 by one or more data media interfaces. The memory 706 can include at least one program product having a set of program modules that are configured to carry out the functions of an embodiment of the present invention.

Program/utility 716, having a set of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of embodiments of the present invention.

The information processing system 702 can also communicate with one or more external devices 720 such as a keyboard, a pointing device, a display 722, etc.; one or more devices that enable a user to interact with the information processing system 702; and/or any devices (e.g., network card, modem, etc.) that enable computer system/server 702 to communicate with one or more other computing devices. Such communication can occur via I/O interfaces 724. Still yet, the information processing system 702 can communicate with one or more networks such as a local area network (LAN), a general wide area network (WAN), and/or a public network (e.g., the Internet) via network adapter 726. As depicted, the network adapter 726 communicates with the other components of information processing system 702 via the bus 708. Other hardware and/or software components can also be used in conjunction with the information processing system 702. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of indicating a probability of errors in multimedia content, the method comprising:
    monitoring work being performed on multimedia content;
    identifying distractions during the monitoring of the work being performed;
    calculating a probability of errors in at least one location of the multimedia content by on the distractions that have been identified; and
    annotating the location with an indication of the probability of errors.

2. The method of claim 1, wherein the multimedia content is text, sound, a 2-D picture, a 3-D picture, a 2-D video, a 3-D video, or a combination thereof.

3. The method of claim 1, wherein the monitoring work being performed includes contemporaneous monitoring of
    pop-ups on a graphical user interface,
    instant messaging,
    e-mail,
    operation of telephone,
    detection of other people within an area,
    switching of windows on a graphical user interface,
    amount of elapsed time on a given task,
    ambient noise,
    user eye-tracking,
    user typing speed,
    user heart rate,
    user breathing rate,
    user blink frequency,
    user skin conductance, or
    a combination thereof.

4. The method of claim 1, where in the calculating the probability of errors includes using a function $F(U,S,P)$ based on
    a determination of user state (U);
    a determination of sensitivity (S) of user input; and
    a determination of user characteristics stored in a profile (P).

5. The method of claim 4, wherein the user state (U) includes
    an output of the work being performed on the multimedia content,
    a day of week,
    a time of day,
    a location, or
    a combination thereof.

6. The method of claim 4, wherein the sensitivity (S) includes
    a location in the multimedia content,
    a category of the multimedia content,
    a complexity of the multimedia content,
    regulatory requirements,
    legal requirements, or
    a combination thereof.

7. The method of claim 4, wherein the profile (P) includes
    sensitivity according to times of day,
    history of creating errors,
    crowd-sourcing of a team,
    presence of specific individuals within a given area,
    vocational profile of user, or
    a combination thereof.

8. The method of claim 4, wherein the function $F(U,S,P)$ uses machine learning.

9. The method of claim 1, wherein the annotating the location with an indication of the probability of errors includes annotating with
    color of text,
    color of background area,
    blinking font,
    font size,
    textures, insertion of tracking bubbles, or a combination thereof.

10. The method of claim 1, further comprising displaying the distractions that have been identified in conjunction with the annotating.

11. The method of claim 1, in which the multimedia content is an audio signal and the annotating includes graphical markers in a graphic representation of the audio signal, additional audio, or a combination thereof.

12. The method of claim 1 in which the multimedia content is a video signal and the annotating is graphical markers applied to sections of the video signal.

13. The method of claim 1 in which the multimedia content is a video game or virtual universe and the annotating indicates areas of user game play with probabilities of distractions.

14. A system for indicating a probability of errors in multimedia content, the system comprising:

a memory;

a processor communicatively coupled to the memory, where the processor is configured to perform monitoring work being performed on multimedia content;

identifying distractions during the monitoring of the work being performed;

calculating a probability of errors in at least one location of the multimedia content by on the distractions that have been identified; and annotating the location with an indication of the probability of errors.

15. The system of claim 14, wherein the multimedia content is text, sound, a 2-D picture, a 3-D picture, a 2-D video, a 3-D video, or a combination thereof.

16. The system of claim 14, wherein the monitoring work being performed includes contemporaneous monitoring of pop-ups on a graphical user interface, instant messaging, e-mail, operation of telephone, detection of other people within an area, switching of windows on a graphical user interface, amount of elapsed time on a given task, ambient noise, user eye-tracking, user typing speed, user heart rate, user breathing rate, user blink frequency, user skin conductance, or a combination thereof.

17. The system of claim 14, where in the calculating the probability of errors includes using a function $F(U,S,P)$ based on a determination of user state (U);

a determination of sensitivity (S) of user input; and a determination of user characteristics stored in a profile (P).

18. The system of claim 17, wherein the user state (U) includes an output of the work being performed on the multimedia content, a day of week, a time of day, a location, or a combination thereof.

19. The system of claim 17, wherein the sensitivity (S) includes a location in the multimedia content, a category of the multimedia content, a complexity of the multimedia content, regulatory requirements, legal requirements, or a combination thereof.

20. A non-transitory computer program product for indicating a probability of errors in multimedia content, the computer program product comprising a computer readable storage medium having computer readable program code embodied therewith, the computer readable program code configured to perform:

monitoring work being performed on multimedia content;

identifying distractions during the monitoring of the work being performed;

calculating a probability of errors in at least one location of the multimedia content by on the distractions that have been identified; and annotating the location with an indication of the probability of errors.

* * * * *